Patented Sept. 10, 1929.

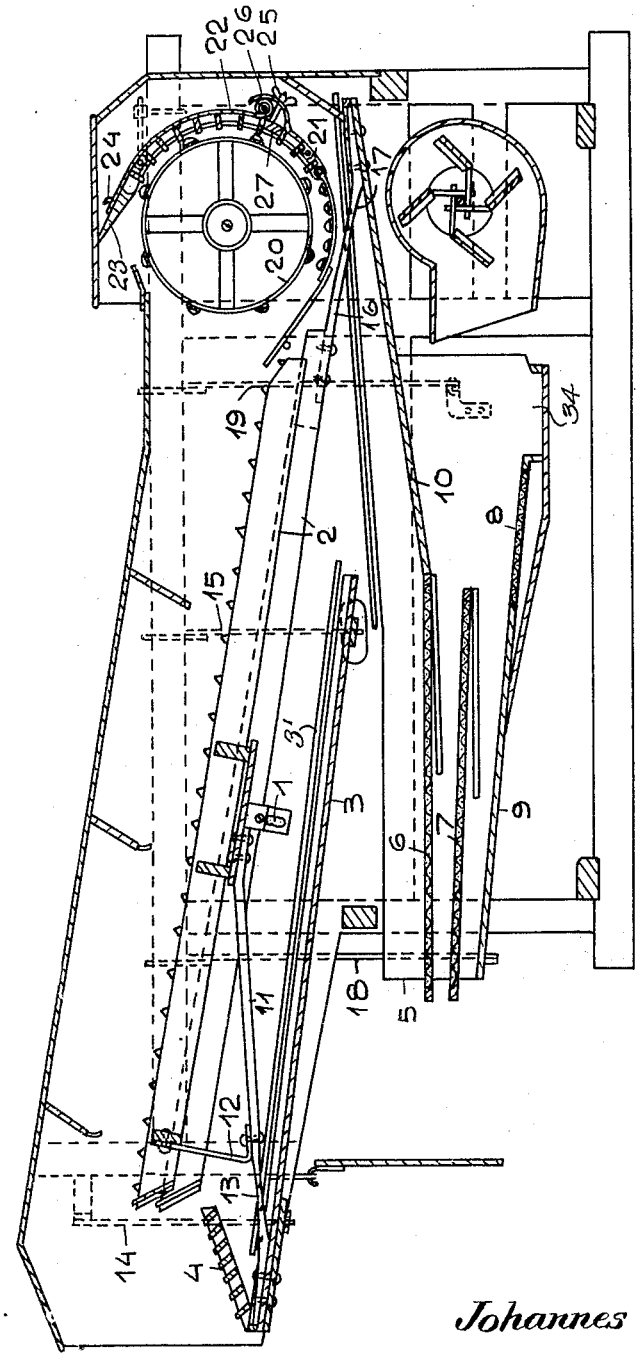

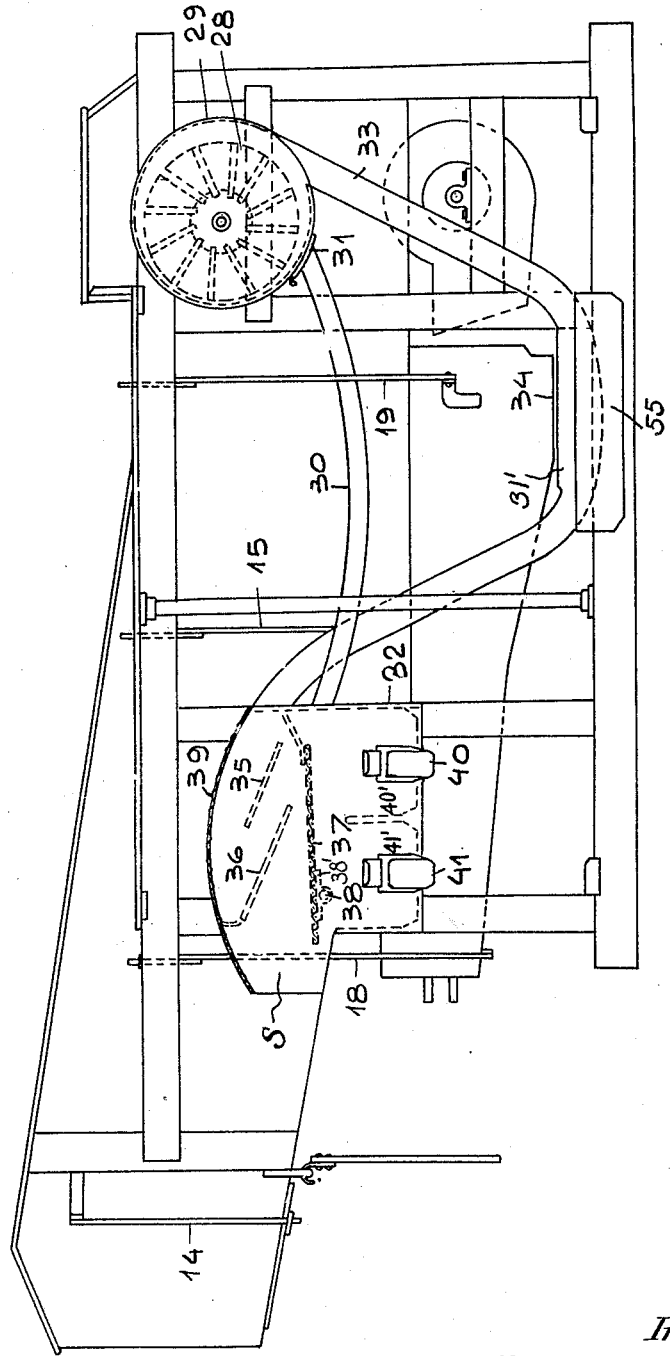

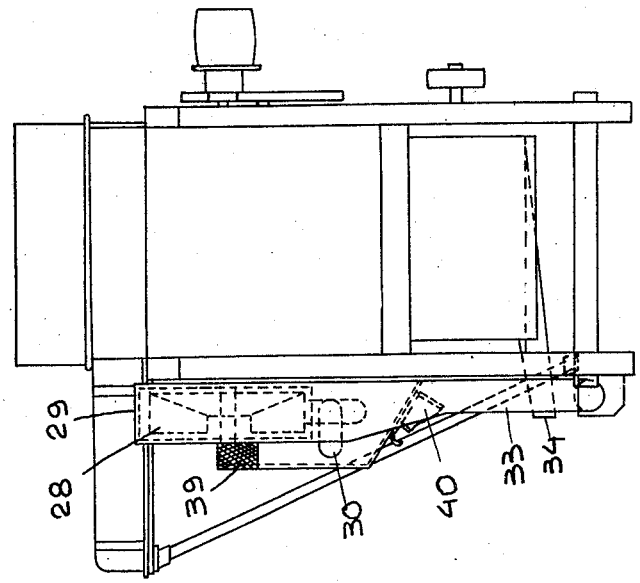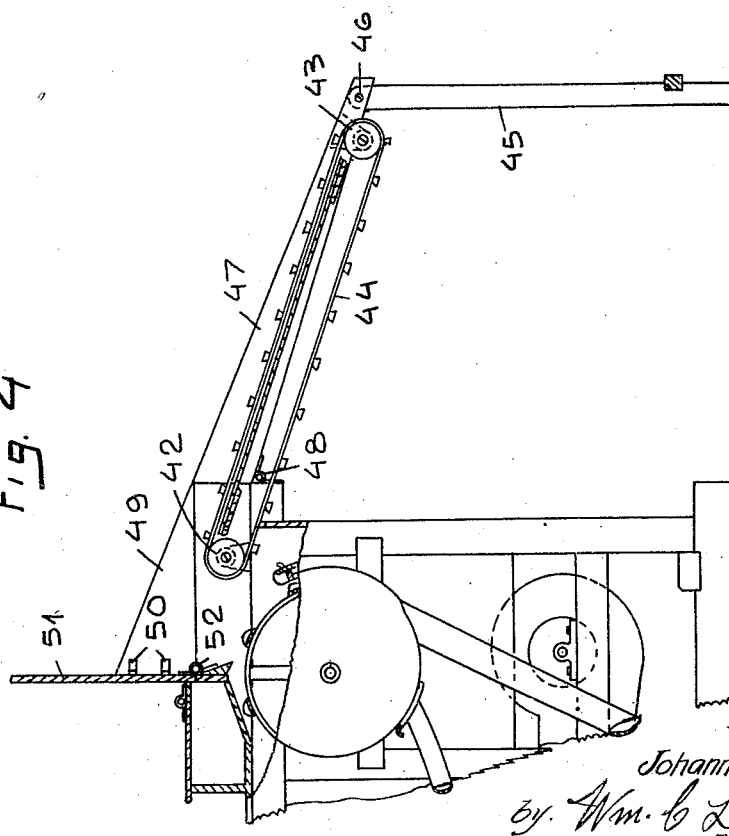

1,728,124

UNITED STATES PATENT OFFICE.

JOHANNES JAAKKOLA, OF HARJAVALTA, SUOMI-FINLAND.

THRASHING MACHINE.

Application filed May 9, 1925. Serial No. 29,196.

The invention has for its object a thrashing machine, by means of which through a practical combination of the moving parts and through special arrangements a complete and quick separation and cleaning of the grain is obtained.

The attached drawings show a way of carrying out the idea of the invention.

Fig. 1 shows the thrashing machine in section.

Fig. 2 is a side view of the machine.

Fig. 3 is an end view of the machine.

Fig. 4 shows the machine in combination with a special carrier for feeding in the sheaves.

The crank-shaft 1 of the straw shaker sets in motion the straw shaker 2, the incline 3 and in combination with it a straw sieve 3′, the sieve box 5 with the sieves 6 and 7 and finally the inclines 10 and 9, which latter incline 9 may be furnished with a sieve at 8.

The straw shaker 2, which is composed of two or more units, gets its motion from the crank-shaft in the usual way. The other parts are set in motion as follows; to one or every other unit of the straw shaker, preferably near the bearings of the crank-shaft, is rigidly attached one end of a pitman 11, the other end of which being rigidly attached to the incline 3. The combination thus obtained is made firmer by means of a brace 12. The pitman is furnished between the brace 12 and the incline 3 with a somewhat flexible part 13. The incline 3 is supported in the usual way by the flexible hinges 14 and 15, and will thus be free to move with said straw shaker.

To one or more units of the straw shaker, but different from the units just mentioned, a pitman is rigidly attached, preferably to the end of the shaker. The pitman is furnished with an extension 17, the end of which is rigidly attached to the incline 10 in the sieve box. The sieve box is supported in the usual way by the flexible hangers 18 and 19.

The machine is furnished with a toothed cylinder 20 coacting with concave 21 which extends further than usual around the cylinder in such a way as to enable the feeding to take place obliquely from above. The outside of the concave is furnished with a canvas 22 or something similar, so as to enable the grain separator to be used as a beater and if necessary as a hay-seed rubber as well. The canvas 22 is attached at its upper end by means of hooks 24 to a guide 23 and positioned on the outside of the concave and over the concave bars. The length of the canvas is adjustable in such a way, that its lower end, which reels upon a roller, may be fixed at will by means of a thumb nut 25 and a clamping plate 26. The screw of the thumb nut 25 consists of a stem attached to a wooden block 27. The block may be attached at will between different bars of the concaves.

A grain separator, when used as a beater, will deliver the grain mixed with a certain amount of dust and chaff. The residual impurities may be completely removed in the transporting and sizing arrangements of the machine. On the shaft extension of the cylinder there is mounted a fan 28 encased in a drum 29. The drum is furnished with two air chutes. The chute 30, which may be closed by means of a door 31, leads directly to the screen box 32. The chute 33 is bent downward and is open at the knee 31′ supported by a pan like member 55. The grain, which has passed through the sieves from the sieve box 5, drops into this knee through the duct 34. The blast takes the grain along, delivering it into the screen box S and tossing it against the inclines 35 and 36 therein, whence it lands on the sieve 37 also in said screen box S. The sieve gets its motion for instance by means of an eccentric or, as suggested in dotted line on Fig. 2, by means of a rod 38 attached to the sieve 37 through a bracket 38′ and likewise connected to the movable incline 3 shown in Fig. 1. The blast through the chute 30 helps in sizing and cleaning of the grain. The chute 30 opens below the chute 33 and the blast through the chute 30 is directed through the screen 37. The dust and other impurities are blown out through the sieve 39 comprising the cover of the screen box. The heavier grain is discharged through the hopper 40 from compartment 40', the lighter grain being discharged through the hopper 41 from compartment 41'.

A suitable carrier is shown on Fig. 4. An endless chain or rope (44) or such, which gets its motion from the moving elements of the machine and moves over pulleys 42 and 43, transports the sheaves into the feeder of the machine. It is to be noted that the carrier can be folded. The legs 45 are hinged on pins 46. The frame 47 folds down on a hinge 48. The frames and legs are thus folded along the end of the thrashing machine. The side wings 49 fold over the end-plate 51 on hinges 50. The end-plate 51 in turn folds down on hinges 52.

I claim:

1. In a thrashing machine, a toothed grain thrashing and feeding cylinder, a concave extending about the greater portion of said cylinder, and an adjustable canvas arranged about the outer side of said concave.

2. In a thrashing machine, a toothed grain thrashing and feeding cylinder, a concave extending about the greater portion of said cylinder, and a removable adjustable canvas arranged about the outer sides of said concave.

3. In a thrashing machine, a toothed grain thrashing and feeding cylinder, a concave extending about the greater portion of said cylinder, a canvas arranged upon the outer side of said concave and having one end detachably secured to the upper portion of the same, and movable means carrying the free end of said canvas whereby the latter may be adjusted over said concave.

4. In a thrashing machine, a toothed grain thrashing and feeding cylinder, a concave having a plurality of spaced parallel bars extending about the greater portion of said cylinder, a canvas arranged upon the outer side of said concave and having one end detachably secured to the upper portion of the same, a roller for winding the free end of the canvas, and a movable block carrying said roller, said block being insertable between any two consecutive parallel bars of said concave whereby the canvas may be adjusted over said concave.

In witness whereof I have hereunto set my hand.

JOHANNES JAAKKOLA.